United States Patent [19]

Zinovi

[11] Patent Number: 5,108,049
[45] Date of Patent: Apr. 28, 1992

[54] DEVICE FOR OVERCOMING THE PROBLEM OF CREW SAFETY DURING A SPACECRAFT LAUNCH AND IMPROVE THE JOINTS CONNECTING THE SEGMENTS OF THE SOLID ROCKET BOOSTER

[76] Inventor: Levin Zinovi, 78 Kensington Gardens, Ilford, Essex 1G1 3EN, Great Britain

[21] Appl. No.: 271,758
[22] PCT Filed: Dec. 15, 1987
[86] PCT No.: PCT/GB87/00906
§ 371 Date: Aug. 14, 1990
§ 102(e) Date: Aug. 14, 1990
[87] PCT Pub. No.: WO88/06120
PCT Pub. Date: Aug. 25, 1988

[30] Foreign Application Priority Data
Feb. 10, 1987 [GB] United Kingdom ............ 8703025

[51] Int. Cl.$^5$ .............................................. B64G 1/00
[52] U.S. Cl. ............................... 244/158 R; 244/139; 244/140; 244/131; 102/377; 102/378
[58] Field of Search ............ 244/158 R, 160, 139, 244/140, 162, 120, 131; 102/377, 378

[56] References Cited

U.S. PATENT DOCUMENTS

| 2,693,923 | 11/1954 | Bigio ............................ 244/140 |
| 2,702,680 | 2/1955 | Heinemann .................... 244/140 |
| 2,733,027 | 1/1956 | Gero ............................. 244/140 |
| 2,979,285 | 4/1961 | Planitzer ...................... 244/140 |
| 3,099,959 | 8/1963 | Bowersett ..................... 102/377 |
| 3,286,630 | 11/1966 | Salmirs ......................... 102/49 |
| 3,368,486 | 2/1968 | Webb ............................ 102/49 |
| 3,374,965 | 3/1968 | Deutsch ..................... 244/140 X |
| 3,420,470 | 1/1969 | Meyer ...................... 102/379 X |
| 3,458,217 | 7/1969 | Pride, Jr. et al. ............. 102/378 |
| 3,855,789 | 12/1974 | Platzek ......................... 102/378 |
| 4,627,355 | 12/1986 | Gause et al. .................. 102/378 |
| 4,715,565 | 12/1987 | Wittmann .................. 244/158 R |
| 5,031,860 | 7/1991 | Ruiz et al. ................. 244/140 X |

FOREIGN PATENT DOCUMENTS 1002316 9/1946 France ............................ 244/140

Primary Examiner—Joseph F. Peters, Jr.
Assistant Examiner—Christopher P. Ellis

[57] ABSTRACT

A crew capsule 2 is connected to the body 3 of a spacecraft by a releasable coupling comprising a housing 6 secured to the capsule, a sleeve 9 secured to the body 3, and clamps 11-15 engaging interrupted thread 10 on sleeve 9 and having hooked ends engaging a flange 7 on housing 6. In an emergency during launch, an hydraulic ram 21 energised by a pump 24 is actuated to rotate the clamps 11-15, which are circumferentially interconnected, relative to the sleeve 9 to disengage the clamp threads from the sleeve thread sections 10; then explosive charges 25 are fired to separate the capsule 2 from the body 3, the capsule subsequently descending by parachute.

A similar releasable connection may be used between segments of a Solid Rocket Booster, or between the passenger cabin and other parts of a passenger-carrying aeroplane.

11 Claims, 8 Drawing Sheets

DEVICE FOR OVERCOMING THE PROBLEM OF CREW SAFETY DURING A SPACECRAFT LAUNCH AND IMPROVE THE JOINTS CONNECTING THE SEGMENTS OF THE SOLID ROCKET BOOSTER

BACKGROUND OF THE INVENTION

The invention relates to a device for ensuring cargo safety within aircraft. Such a device is known from U.S. Pat. No. 2,702,680; this document, however, only describes ejector systems for aircraft.

The present invention relates, to a device for overcoming the problem of crew or satellite safety and escape with particular application to launches of spacecraft, and manned or unmanned satellites and to aircraft that are constructed with a detachable compartment including a crew capsule or satellite which is detachably clamped in butt jointed fashion to the main body of the launch vehicle or aircraft. A crew using the detachable compartment to get free of their launch vehicle will be safely dropped, when a dangerous situation arises.

It is known that at present time there is no evidence that on manned spacecraft and satellites or aircraft there exist satisfactory developed techniques for coming to the rescue of the on-board multi-person crew or other occupants in an emergency. All that is known is that existing manned spacecraft are provided with an emergency exit door.

It would be very hazardous for the multi-person crew to attempt to escape that way since a spacecraft has a very high speed during vertical lift off, whilst the spacecraft is in this critical condition there is too short a time for the multi-person crew to prepare to abandon the spacecraft through such an emergency exit.

An object of the present invention is to provide spacecraft with device which may be operated when the spacecraft crew wish to abort the launch when a dangerous situation arises. By operating, e.g. a push button, the crew capsule which is only a small part of the spacecraft may automatically detach and separate itself from the remainder of the spacecraft and make a safe, soft landing.

Moreover to overcome the known faulty design of the joints connecting the segments of the solid rocket booster, the O-ring seals on the Shuttle, the invention provides, in preferred embodiment, a construction of the joints connecting the segments of the solid rocket booster, with multiple thread clamps and sectors and metallic packing which is disposed between the segments to prevent burning fuel escaping in the most adverse weather conditions.

Similarly the device of the invention can be used to salvage a satellite, when it is discovered during a satellite launch that the satellite will deviate from its path. This can be put into effect from the ground control, in consequence of which satellite detaches and separates itself from launch vehicle and makes a safe, soft landing.

SUMMARY OF THE INVENTION

A device for overcoming the problem of crew or satellite safety and escape with particular application to launches of spacecraft, and manned or unmanned satellites and to aircraft; the device comprising a detachable compartment including a crew capsule or satellite which is detachably clamped in butt jointed fashion to the main body of the launch vehicle or aircraft; a mechanism to eject and a controlled explosive charge activated by an impact mechanism which forces the compartment to separate from the main body either during flight or on launch pad or runway is provided. Separation during a vertical lift off by means of the controlled explosion enabling the compartment to maintain a vertical trajectory and thus avoiding collision with the main body is also made possible. There is a release of the clamping of the compartment and operation of the impact mechanism is entirely independent of the main body power supply and is operated from within the compartment wherein the compartment is clamped to the main body by a plurality of screw threaded clamps each one of which engages the threads of one of a plurality of screw threaded sectors spaced apart circumferentially and fixed on the main body. Further, there is a draw hook on each clamp engaging a thrust ring extending around the outer surface of the compartment body to clamp the compartment on the main body, the clamps are rotatable about the compartment by a clamp release mechanism within the compartment to a position in which the clamps and sectors disengage to permit separation of the compartment from the main body.

BRIEF DESCRIPTION OF THE DRAWINGS

An embodiment of the invention is more particularly described below by way of example, with reference to the accompanying drawings, wherein.

DESCRIPTION OF THE PREFERRED EMBODIMENTS

Figure 1:
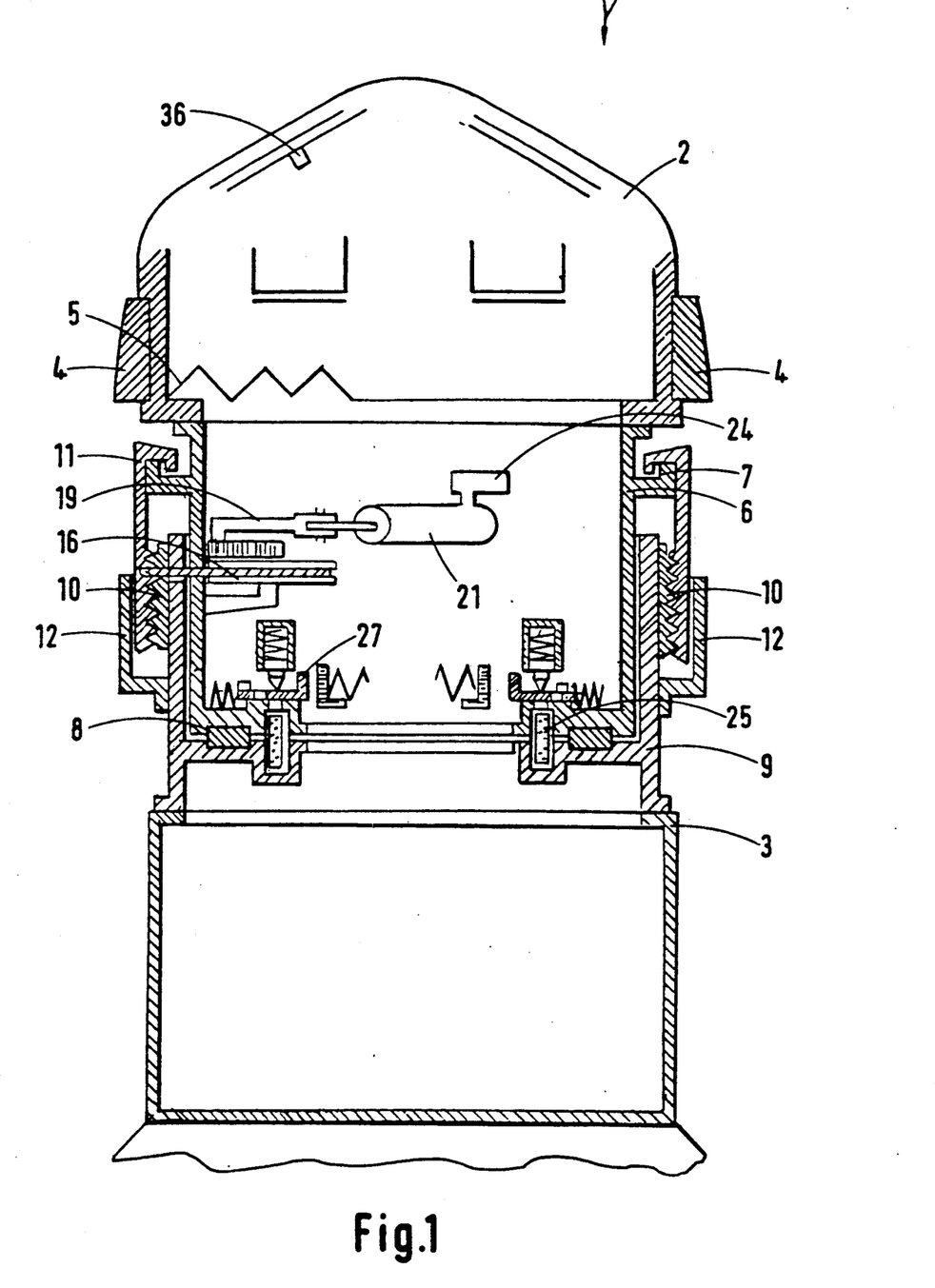
FIG. 1 is a front elevation view of a device mounted on a spacecraft and constructed in accordance with the invention.

Referring particularly to FIG. 1, a spacecraft is shown in position for launch, generally designated Y and comprises: The crew capsule 2, the body of spacecraft 3, a number of parachutes 4, which are disposed on the surface of the crew capsule and on the adjacent side of crew capsule is located the sliding door 5. The crew capsule 2 is coupled with the housing 6 by welding or by means of a fixing screw. The housing 6 is composite with thrust ring 7; the bottom of the housing 6 provided with a ring groove in which is situated the gasket 8; the housing 6 is inserted freely into a through hole of the sleeve 9.

Figure 3:
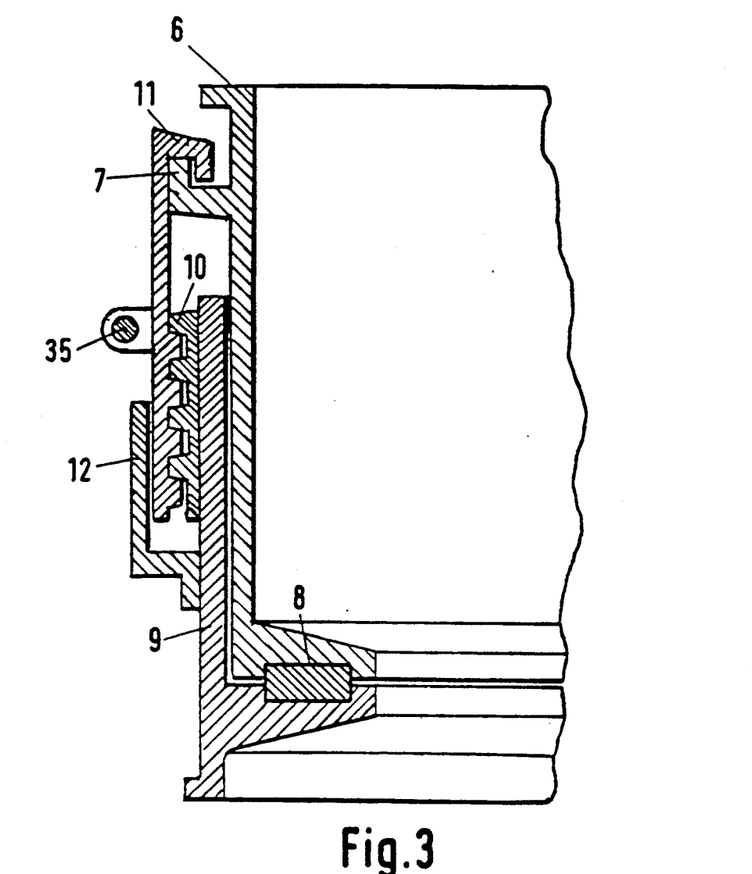
FIG. 3 is an enlarged fragmentary view illustrating the locking device used in the device of FIGS. 1 and 2.
Figure 4:
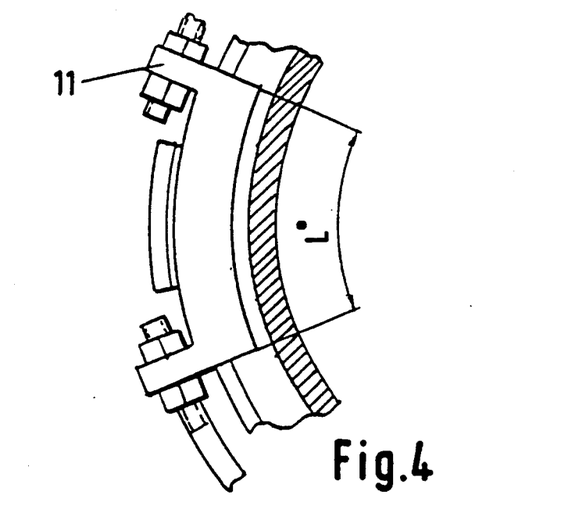
FIG. 4 is a top view of FIG. 3.

As shown particularly in FIG. 1 and FIG. 3, the sleeve is formed with a similar ring groove and seals with the housing 6 by means of gasket 8. By welding or by means of a fixing screw the sleeve 9 is connected with the body of spacecraft 3.

As shown particularly in FIG. 1 and FIG. 3, on the surface of the sleeve 9 are fixed a number of sectors 10, the sectors being disposed in a generally circular fashion around the periphery of the sleeve 9, each sector 10 being provided with a module multiple thread. It will be seen that the sectors 10 screwthreadedly engage the screw clamps 11, 15 which are equal in number to the number of sectors 10 and as well are provided with similar module multiple thread. The screw clamps 11, 15, are further formed with a draw hook engageable with thrust ring 7, which is formed on the housing 6.

Figure 2:
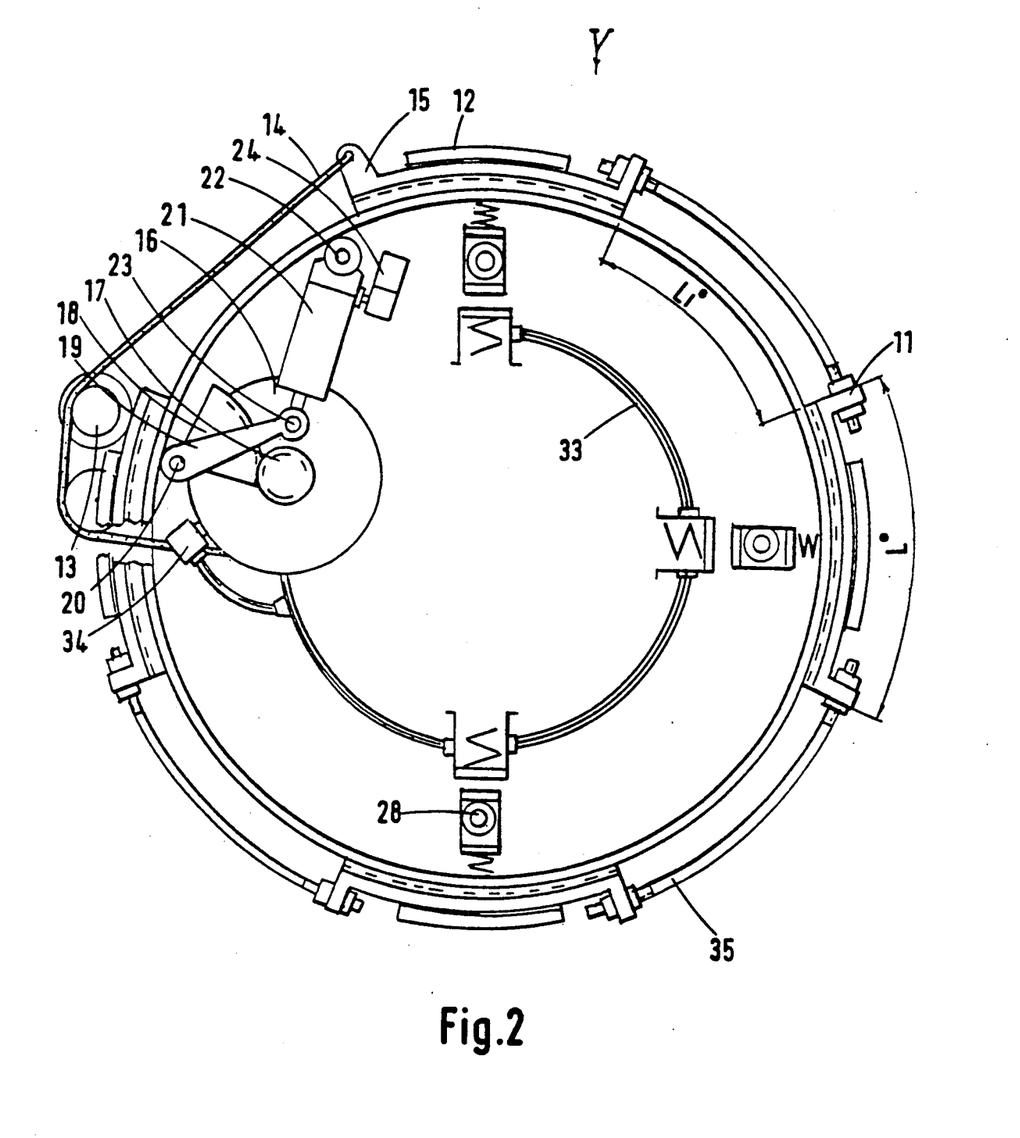
FIG. 2 is a top sectional view of the device of FIG. 1 with crew capsule removed.
Figure 14:
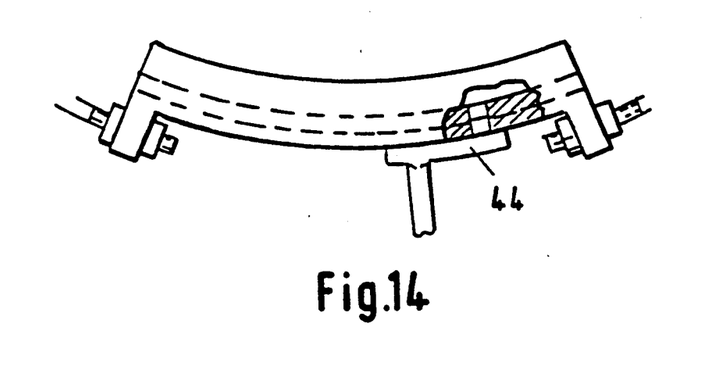
FIG. 14 is a view illustrating the tightening of the screw clamp by means of hook spanner.

As shown particularly in FIG. 1, FIG. 2 and FIG. 3, to engage the screw clamps 11, 15 with sectors 10, the screw clamps (11,15) are initially simultaneously put in spaces $L_1^o$ between sectors 10 (slightly more than the size of sector $L^o$) a draw hook on each screw clamp 11, 15 hanging on a thrust ring 7 and each screw clamp then manually turned to engage with a sector 10, after which the screw clamps 11, 15 are connected by connectors 35 (see FIG. 2 and FIG. 3) secured by a locking nut. Thereafter, by means of hook spanner 44 in conjunction with each screw clamp (see FIG. 14), or some other manner, screw clamps 11, 15 are simultaneously given a good screw. The index movement is transferred to housing 6 and to sleeve 9, accordingly to the crew capsule 2 and to body of spacecraft 3, rotation of the screw clamps 11, 15 being accomplished by guides 12.

It will be seen that by the use of a thread joint, all mating members receive a powerful pressing force produced at considerable dimensions around the periphery of the sleeve and the thrust ring to form a rigid connection.

Figure 5:
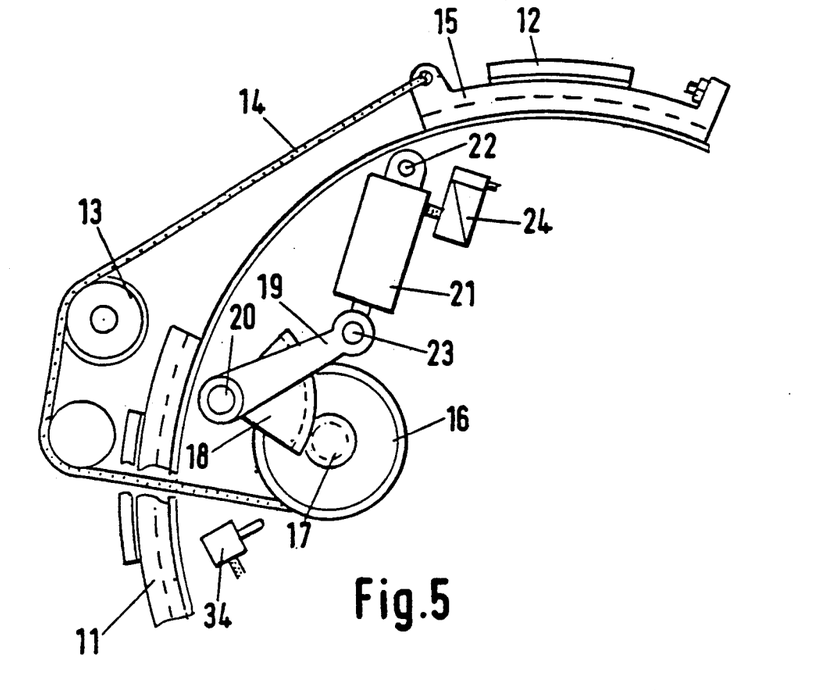
FIG. 5 is an enlarged view illustrating the tripping mechanism used in the device of FIG. 1 and FIG. 2 in its neutral position.

As shown in FIG. 1, FIG. 2 and FIG. 5, on the surface of the housing 6 are mounted a plurality of rollers 13 supporting and guiding a guy rope 14, one end of which is tied to a screw clamp 15 which is provided with a tow ear, the other end passing into a through hole in the housing 6 and being fastened to a winding drum 16. The winding drum 16 coupled with driven gear 17 is freely mounted on a shaft. The driven gear 17 meshes with toothed sector 18 which is coupled with the rocking lever 19 pivotally mounted on pin 20 which is fixed to housing 6.

As shown in FIG. 1, FIG. 2 and FIG. 5, the hydraulic ram 21 is pivotally mounted at one end on pin 22 which is fixed to housing 6 and the other end is pivotally mounted by a pin 23 with rocking lever 19. The hydraulic ram 21 is engaged with a hydraulic pump 24.

Figure 7:
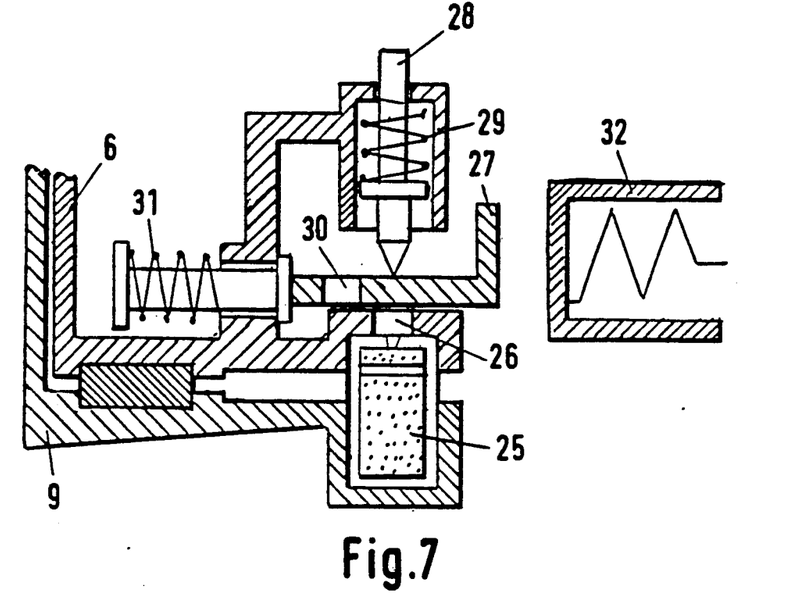
FIG. 7 is an enlarged fragmentary view illustrating the ejection gear used in the device of FIG. 1 and FIG. 2 in its neutral position.

As shown in FIG. 1, FIG. 2 and particularly in FIG. 7, between junction of housing 6 and sleeve 9 are disposed a number of the ejection devices, comprising the ejection gear. The ejection gear comprises a number of permissible explosive 25 each of which is situated in a detonator housing, the detonator housing being disposed between housing 6 and sleeve 9. It will be seen that the detonator housing which is formed in the housing 6 is provided with an opening 26 and protected by the outer surface of safety catch 27 against the striker pin 28 which is actuated by a spring 29.

The safety catch 27 is provided with an opening 30 in position held aside from the striker pin 28 by means of a restraining spring 31.

As shown particularly in FIG. 2 and FIG. 7 a number of plunger electromagnets 32 which is equal to the number of safety catch 27 make electrical communication to the power supply by wire 33 (see FIG. 2) which is connected with switch 34. The plunger electromagnets 32 have been arranged at a distance from safety catch 27 by technical requirements (see FIG. 7).

Figure 6:
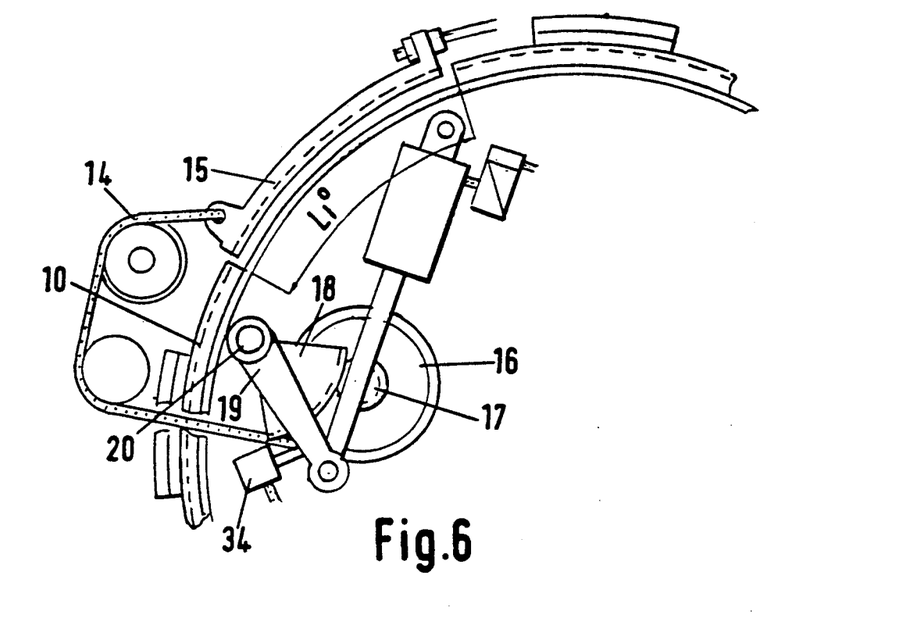
FIG. 6 is an enlarged view illustrating details of the disconnection the locking device used in the tripping mechanism and the arrangements for electrical connection with ejection gear of FIG. 5.

Referring first to the Spacecraft as illustrated in FIG. 1, when prelaunch procedure is ready, the crew of a spacecraft are placed in the crew capsule 2, and the door 5 closed. When during a launch a dangerous situation arises, by operating a push button 36, hydraulic pump 24 is ready for use. The plunger of the hydraulic ram 21 co-operates with a rocking lever 19 which is fixed to the toothed sector 18 via the gear 17 which is fixed to the winding drum 16, whereby the winding drum 16 is driven by hydraulic pump 24 and receives rotary motion to coil up the guy rope 14 which is fastened to winding drum 16; thus the guy rope 14 receives constrained motion. This movement is transferred to clamp 15 (see FIG. 2, FIG. 5, FIG. 6) and further to the clamps 11 which are successively connected by connectors 35.

Figure 8:
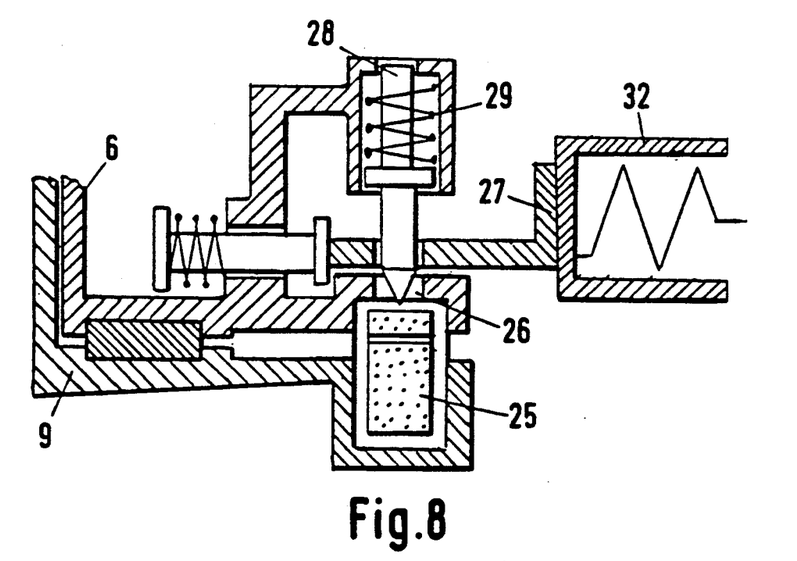
FIG. 8 shows the arrangement for ejection of the crew capsule of FIG. 7.

Thus the clamps 11, 15, are simultaneously moved out of engagement with sectors 10 to put them in the spaces $L_1^o$, and at that time a rib of the rocking lever 19 contacts the switch 34, contact of the tip with the switch 34 being assured. The plungers of electromagnets 32 receive electromagnetic induction excitation (see FIG. 7 and FIG. 8). Therewith the safety catch 27 will slip relative to electromagnet 32 and is so arranged that opening 30 of the safety catch 27 (see FIG. 8) will be disposed under the striker pin 28 which is activated by spring 29 and falls into opening 30 and 26 to impact permissible explosive 25 to produce an expulsive force.

Figure 9:
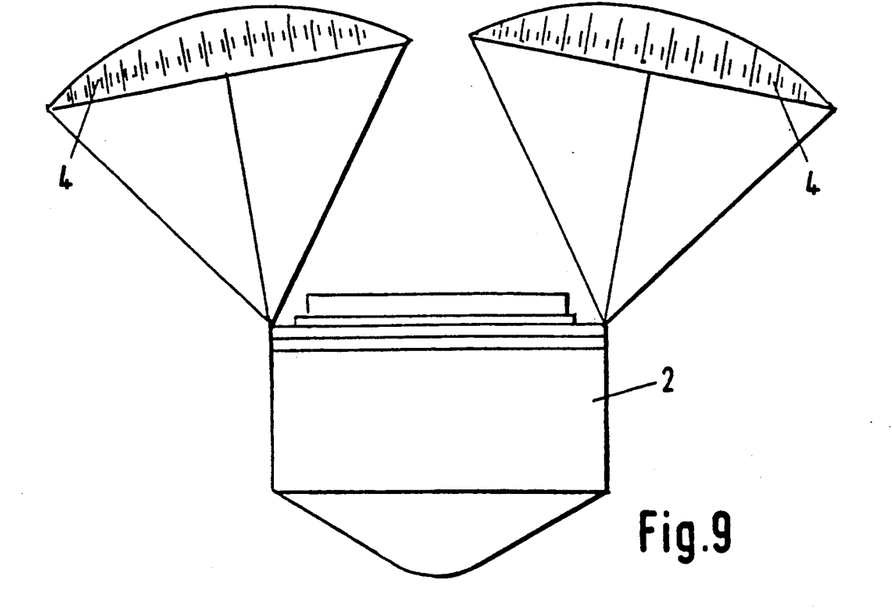
FIG. 9 shows the separation of the crew capsule from the spacecraft after operation of the ejection system of FIG. 1, FIG. 2 and FIG. 8.

Thus the crew capsule 2 with the crew on board detaches and separates itself from the remainder of the spacecraft as illustrated in FIG. 9. When this occurs, landing parachute 4 immediately opens and the capsule 2 with the crew on board makes a safe, soft landing.

Figure 10:
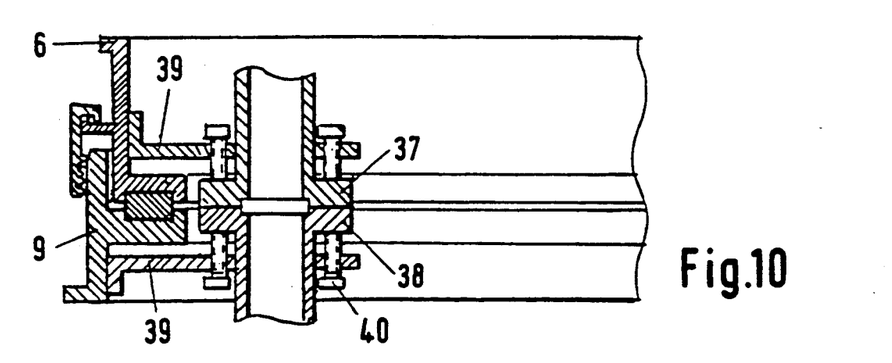
FIG. 10 is a fragmentary view showing details of the abutment joint in distribution lines.
Figure 11:
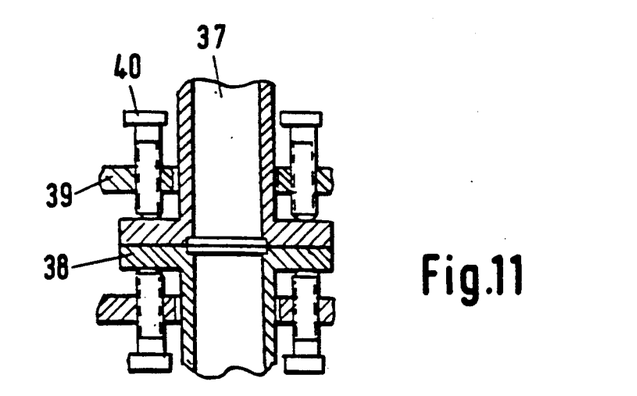
FIG. 11 is an enlarged fragmentary view of FIG. 10.

Referring to the installation of the pipe-line, as illustrated in FIG. 10 and FIG. 11, it will be seen that, on a break line between the housing 6 and the sleeve 9, there two adjustable, similar elements 37 and 38, each secured respectively to housing 6 and to sleeve 9 by means of hanger 39 which includes a number of clamp bolts 40. Thereby the two coupling elements 37 and 38 because of clamp bolts 40 form a tight coupling which easily detaches and separates the parts, one from other, when the crew capsule 2 separates the parts one from the other, and when the crew capsule 2 separates itself from remainder.

Referring now to the satellite. The satellite is provided with a similar safety device as described earlier, but the operation with the satellite is slightly different from operation with a spacecraft. As a rule the satellite accomplishes tasks without a crew on board; therefore the control of a satellite is carried out from the ground control.

When the satellite tends to deviate from a course, ground control activates the motor hydraulic pump 24 (see FIG. 5 and FIG. 6) (the interaction details of device described earlier), the satellite detaches and separates from rocket booster and makes a safe, soft landing.

It should be understood that the gear may be hydraulic or mechanical drive and not only hydraulic drive as indicated in the above embodiment.

A serious and potentially disastrous situation was developing on all Solid Rocket Booster joints and it is reasonable to raise doubts about the safety of seals in the boosters, which fatally flamed in the prevailing conditions. The rubber ring became hard and slow at air temperatures close to freezing point, so that it failed to prevent the escape of burning fuel.

Figure 12:
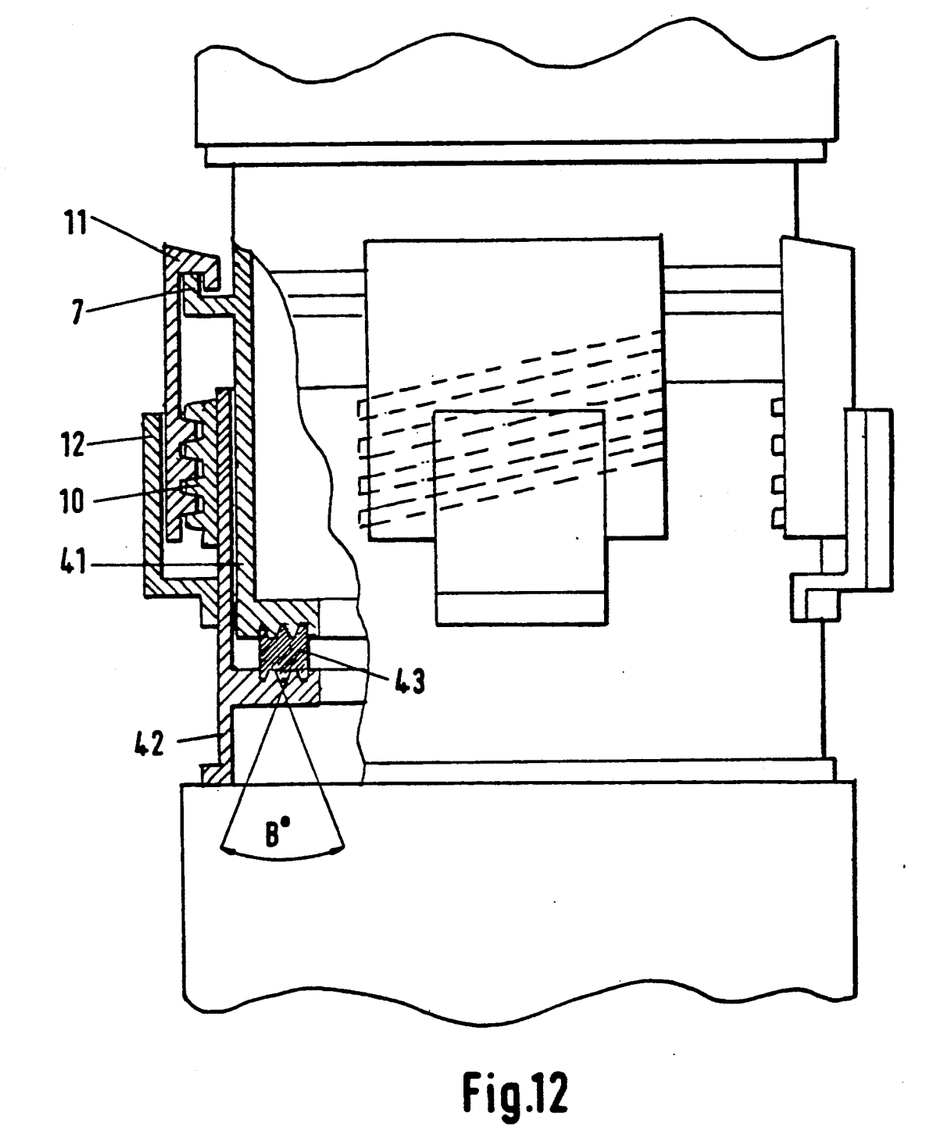
FIG. 12 is an enlarged fragmentary view illustrating details of the joints connecting the segments of the Solid Rocket booster which substitute the O-ring seals used at present time on the Shuttle.

As shown particularly in FIG. 12, a subsidiary object of the invention to further provide improved design of solid rocket seal, to rectify effectively, known design faults in the Solid Rocket Booster joints; the elements are similar to those which are described earlier in FIG. 1 and FIG. 3, with the exception only that the housing 41 (see FIG. 12) is formed with an annular sawtooth formation B° as its end lying against a similar formation carried by a sleeve 42. The housing 41 is connected with solid rocket booster and the sleeve 42 with booster attachment ring. Between housing and sleeve is disposed metallic packing (copper or lead) 43 which have a similar formation carried by housing and sleeve.

Figure 13:
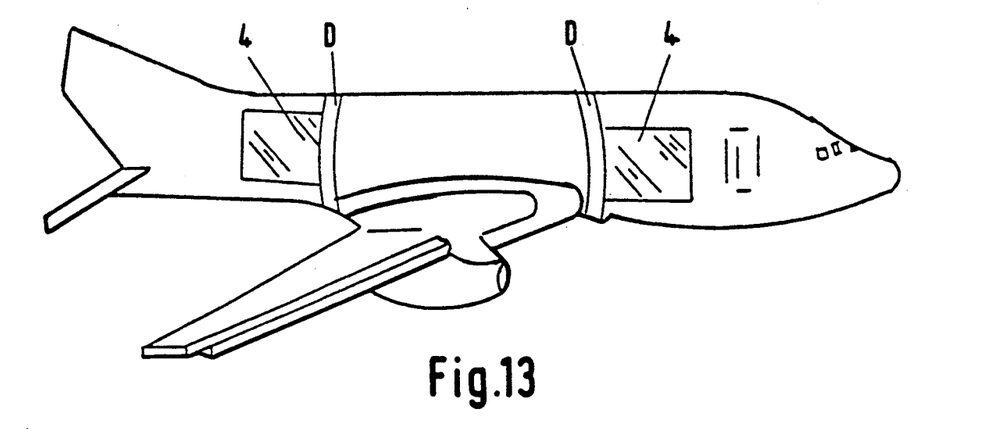
FIG. 13 is a view of a small civil aeroplane in which such a device can be used and shows its installation with spacing between wing aeroplane.

As shown in FIG. 13, a device such as described earlier in FIG. 1, FIG. 2, FIG. 5, FIG. 6, and FIG. 7, can be applied in a small civil aeroplane and located between the wings of the aeroplane as "D", an interval between them being free from passengers, thereby forming compartments which are apart from one other. Each compartment is provided with a door, so as to work in conjunction with the device. When a dangerous situation arises, by operating push buttons which are located in several places in the compartment, the door is automatically and securely locked in the closed position, the compartment detaches and separates itself from the remainder, the landing parachute 4 is opened and the compartment with the passenger on board makes a safe, soft landing.

The device illustrated in the drawings is used as follows:

First, the device may be applied to overcoming the problem of crew safety during a spacecraft launch.

Second, the device may be applied to the salvage of a satellite when the satellite tends to deviate from a course.

Third, a similar device may be applied to improve the joints connecting the segments of the Solid Rocket Booster.

Fourth, the device may be applied to overcoming the problem of passenger safety during flight of the small civil aeroplane, the locking device producing abutment joints of the components of the flying vehicle by screw joint, sectors 10 with screw clamps 11, 15 and thrust ring 7, which becomes operable when the crew wish to abort the launch when a dangerous situation arises, by operating a push button 36 (FIG. 1) to put into operation hydraulic pump 24 which drives a plunger of the hydraulic ram 21, rocking lever 19, toothed sector 18, gear 17 and the winding drum 16.

The winding drum 16 receives rotary motion to coil up the guy rope 14 (see FIG. 2, FIG. 5, FIG. 6); thus the clamps 11, 15, simultaneously are moved out of engagement with sectors 10; at that time a rib of the rocking lever 19 contacts the switch 34 at the tip, and the plungers of electromagnet 32 (FIG. 7 and FIG. 8) receive electromagnetic induction excitation. Therewith the safety catch 27 will slip relative to electromagnet 32 and opening 30, of the safety catch 27 will be disposed under the striker pin 28 which is actuated by spring 29 and falls into opening 30 and 26 to impact permissible explosive 25 to produce expulsive force. Thus the crew capsule 2 (FIG. 1) or a component of the flying vehicle etc. detaches and separates itself from the remainder (see FIG. 9); when this occurs the landing parachute 4 immediately opens and the capsule 2 with the crew on board makes a safe, soft landing.

I claim:

1. A device for ensuring cargo safety with particular application to aircraft and launch vehicles;
   the device comprising a detachable compartment including a cargo capsule which is detachably clamped in butt jointed fashion to a main body of the launch vehicle;
   a controlled explosive charge activated by an impact mechanism which forces the compartment to separate from the main body either during flight or during lift off in the event of a dangerous situation;
   separation being initiated by means of a controlled explosion enabling the compartment to maintain a vertical trajectory thus avoiding collision with the main body, the release of the compartment and operation of the impact mechanism being entirely independent of a main body power supply and being operated from within the compartment wherein the compartment is clamped to the main body by a plurality of screw threaded clamps each one of which engages the threads of one of a plurality of screw threaded sectors spaced apart circumferentially and fixed on the main body; a draw hook on each clamp engages a thrust ring extending around an outer surface of the compartment body to clamp the compartment on the main body, the clamps being rotatable about the compartment by a clamp release mechanism within the compartment to a position in which the clamps and sectors disengage to permit separation of the compartment from the main body.

2. The device as claimed in claim 1 in which successive clamps are connected by means of strainers in a generally circular arrangement, which arrangement, is connected to a winding drum by a rope, the winding drum and rope forming part of the clamp release mechanism.

3. The device as claimed in claim 2 in which said clamp release mechanism for disengaging the compartment from the main body comprises a hydraulic ram pivotably mounted on a joint rocking lever connected with a toothed sector which is connected to a gear fixed to and arranged to rotate the winding drum, the hydraulic ram being driven by a hydraulic pump.

4. The device as claimed in claim 1 in which there are a plurality of said explosive charges each ignitable by means of said impact mechanism and disposed in a generally circular array between the compartment and the main body.

5. The device as claimed in claim 4 in which each impact mechanism includes and slidable safety catch formed with an aperture as slidable by means of an electromagnet from a safe position to a position where the aperture is aligned with the pin where within the aperture is a remote striker pin for impacting the explosive charge.

6. The device as claimed in claim 5 in which each said electromagnet is connected via a switch to a respective source of electrical power, to arrange the opening of the safety catch to the position where the aperture is under the striker pin which is resiliently biased to fall into the opening to impact the explosive charge to cause forceful separation of the compartment from the main body of the launch vehicle or Aircraft.

7. The device as claimed in claim 1 in which said compartment is equipped with a parachute for supporting it when it is detached from the main body.

8. The device as claimed in claim 1 in which the segments of a Solid Rocket Booster are joined by a Locking Device arranged in a series of interengaging clamps and sectors each provided with a module multiple thread.

9. The device as claimed in claim 8 in which the ends of the segments are butt jointed with intermediate metallic packing formed with an annular sawtooth to prevent the escape of burning fuel at air temperature close to freezing point.

10. The device as claimed in claim 1 wherein the cargo comprises a crew.

11. The device as claimed in claim 1 wherein the cargo comprises a satellite.

* * * * *